United States Patent [19]
Prest

[11] Patent Number: 5,657,792
[45] Date of Patent: Aug. 19, 1997

[54] CAPPED SLEEVE FOR DISCHARGE OUTLET

[76] Inventor: J. David Prest, P.O. Box 23929, Tempe, Ariz. 85285

[21] Appl. No.: 540,041

[22] Filed: Oct. 6, 1995

[51] Int. Cl.$^6$ ................................................ F16L 55/10
[52] U.S. Cl. ........................... 138/89; 138/89.1; 285/12; 285/148.26
[58] Field of Search ............... 138/89, 89.1–89.4; 215/354, 355; 220/8, 254–256, 212, 375; 285/397, 175–177, 12

[56] References Cited

U.S. PATENT DOCUMENTS

| | | | |
|---|---|---|---|
| 3,788,676 | 1/1974 | Lossie | 285/387 X |
| 4,132,225 | 1/1979 | Whattam | 215/306 X |
| 4,231,596 | 11/1980 | Ridenour | 285/397 X |
| 4,530,527 | 7/1985 | Holmberg | 285/397 X |
| 4,660,860 | 4/1987 | Todd | 285/12 |
| 4,669,641 | 6/1987 | Holmes | 215/306 X |
| 4,688,833 | 8/1987 | Todd | 285/175 |
| 4,708,370 | 11/1987 | Todd | 285/12 |
| 4,722,556 | 2/1988 | Todd | 285/12 |
| 4,758,027 | 7/1988 | Todd | 285/177 |
| 5,149,149 | 9/1992 | Wu | 285/397 X |
| 5,325,980 | 7/1994 | Grimm et al. | 215/306 X |
| 5,333,910 | 8/1994 | Bailey | 285/12 |

*Primary Examiner*—Patrick Brinson
*Attorney, Agent, or Firm*—Cahill, Sutton & Thomas P.L.C.

[57] ABSTRACT

One end of a sleeve is inserted into a waste water discharge outlet of a recreational vehicle until an annular flange abuts the discharge outlet. Each of a plurality of plastic ties interconnects one dog attendant the discharge outlet and the annular flange to retain the sleeve in engagement with the discharge outlet. A cap is removably attached to the other end of the sleeve to close the sleeve when a conventional discharge hose is not mounted on the other end of the sleeve. The cap may include a hollow threaded boss for threadedly engaging the end of a garden hose. A further removable cap is included for the boss to accommodate closure of the boss.

22 Claims, 2 Drawing Sheets

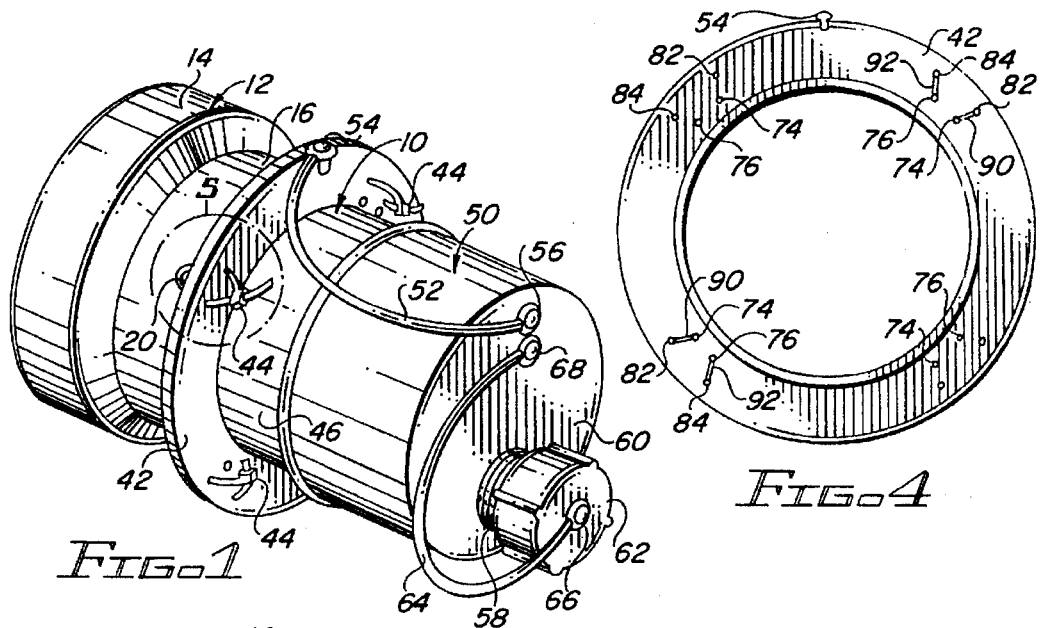
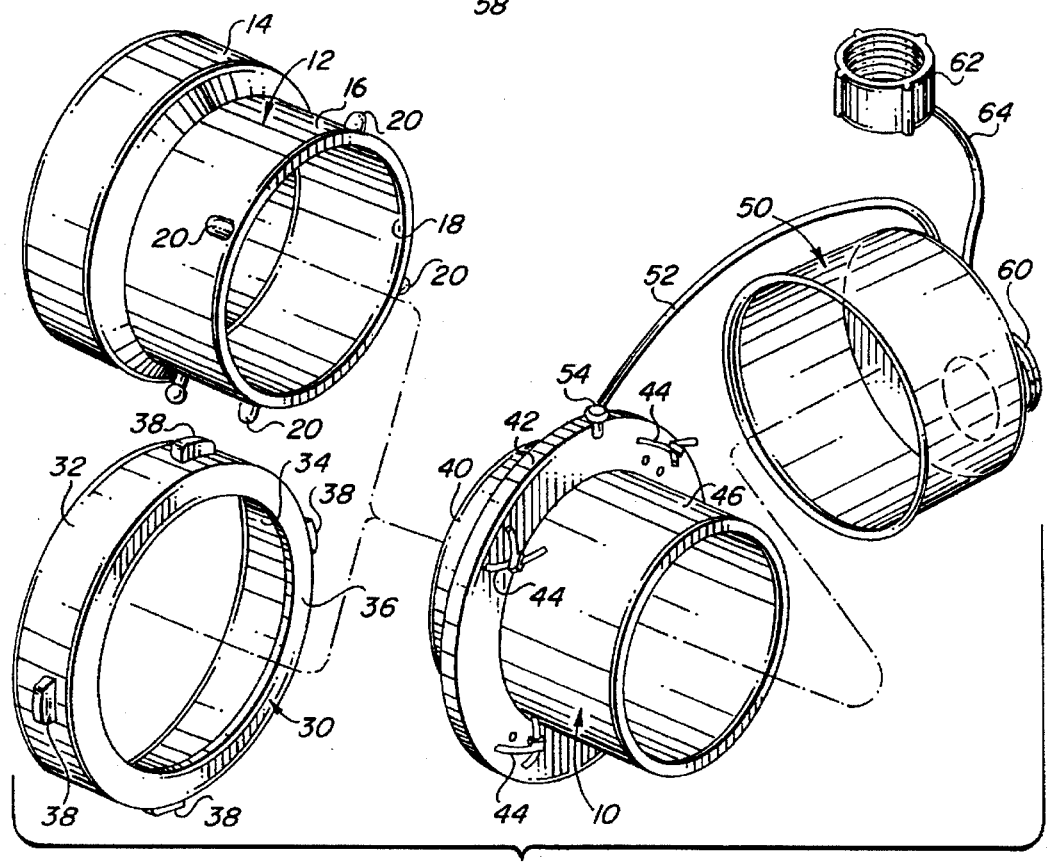

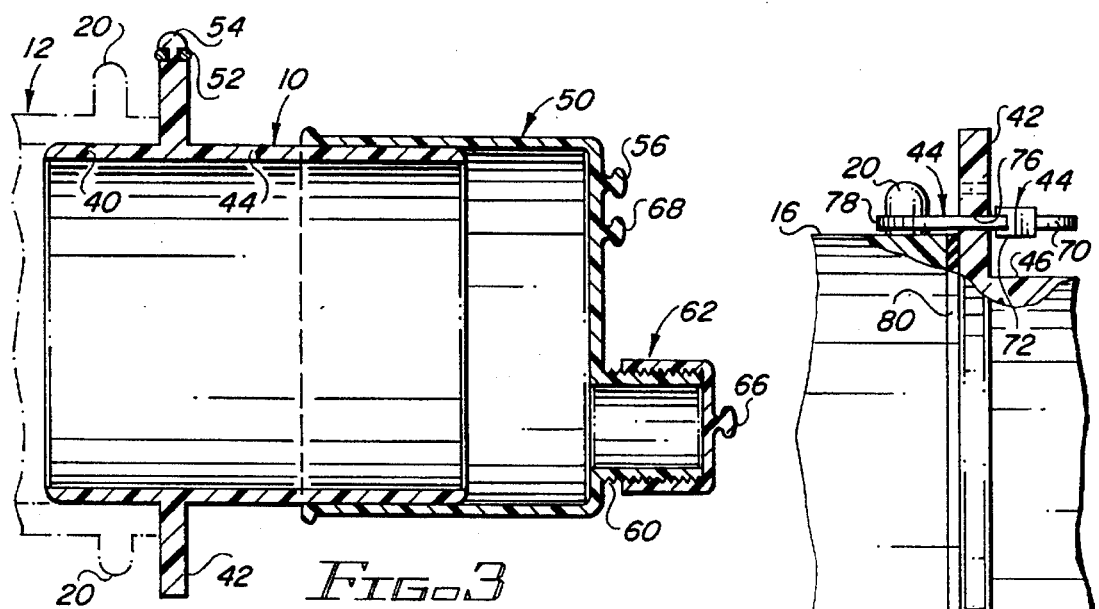
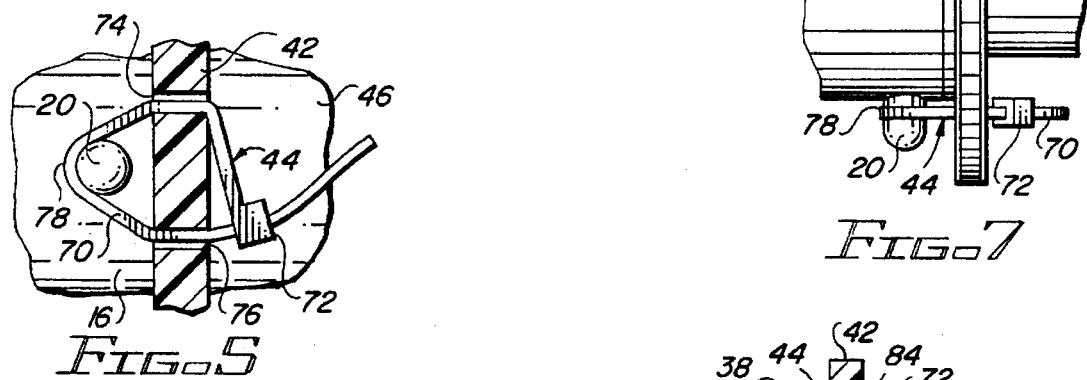
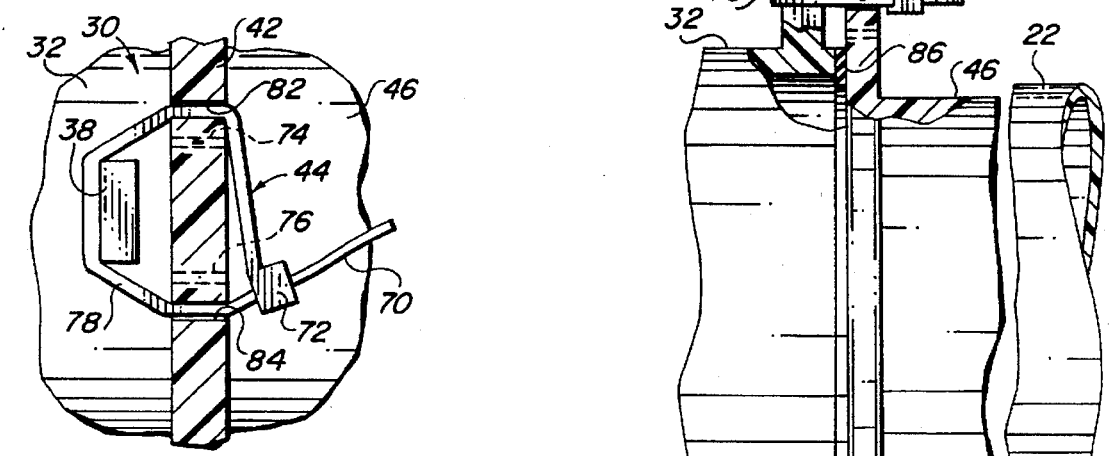

CAPPED SLEEVE FOR DISCHARGE OUTLET

BACKGROUND OF THE INVENTION

1. Field of the Invention

The present invention relates to fluid flow interconnecting apparatus and, more particularly, to a sleeve for interconnecting a discharge outlet of a recreational vehicle with a discharge hose.

2. Description of Related Art

Recreational vehicles may be defined as self-contained motor homes that provide living quarters and sanitation needs year-round. A water tank provides water for all the normal purposes and a holding tank is provided for the waste water. From time to time, the holding tank must be emptied upon the ground, into a sump, into a sewer, or into a collection tank. A discharge outlet, usually mounted at the side of the recreational vehicle, includes a valve, such as a gate valve, for regulating the discharge of waste water.

The discharge outlet may be one of two industry standard types. Either type includes two pairs of orthogonally oriented dogs extending radially from about the outlet. One of two types of industry standard fittings commensurate with the respective discharge outlet having a pair of opposed hooks is retained in place by the hooks engaging one of the pairs of dogs to locate one end of the fitting in fluid communication with the discharge outlet. The other end of the fitting includes a smooth surfaced sleeve over which a discharge hose is fitted. The discharge hose conveys the waste water from the discharge outlet via the fitting to the selected depository for the waste water.

Because a discharge outlet is one of two industry standard types of outlets, the industry standard fitting to be attached must match the discharge outlet. This requires that the user of the recreational vehicle have on hand the particular fitting which matches the discharge outlet of the recreational vehicle in order to dispose of the waste water. Furthermore, the fittings are very easy to remove, which encourages theft in the event the fitting is left in engagement with the discharge outlet on purpose or inadvertently. While the fittings are not exorbitant in price, they are sufficiently expensive to warrant economic concerns, as well as inconvenience, about loss due to theft or inadvertent disengagement from the discharge outlet while the recreational vehicle is under way.

SUMMARY OF THE INVENTION

A sleeve includes a first end for penetrable engagement with the discharge outlet of a recreational vehicle. The degree of penetration is restricted by an annular flange extending about the sleeve. The other end of the sleeve is configured for penetrable engagement with one end of a conventional flexible discharge hose to convey waste water to a remote location. A loop of a plastic tie extends through apertures in the flange partially about one of the radially extending dogs attendant a conventional discharge outlet. By tightening the loop, the flange is drawn adjacent the discharge outlet to secure the sleeve in place and to form a seal between the flange and the discharge outlet. Additional loops may be employed to engage additional ones of the dogs. A gasket may be disposed adjacent the flange to enhance the seal between the flange and the discharge outlet.

It is therefore a primary object of the present invention to provide an interconnection between the discharge outlet of a recreational vehicle and a discharge hose to accommodate flow of waste water into the discharge hose.

Another object of the present invention is to provide a discharge hose supporting sleeve for use with either of two industry standard discharge outlets that may be mounted upon a recreational vehicle.

Still another object of the present invention is to provide an inexpensive fitting for interconnecting a discharge outlet of a recreational vehicle with a discharge hose.

Yet another object of the present invention is to provide a sleeve suitable for permanent mounting with the discharge outlet of a recreational vehicle to permit intermittent attachment of a discharge hose to empty waste water from a holding tank.

A further object of the present invention is to provide a sleeve easily permanently attachable to a discharge outlet of a recreational vehicle to accommodate engagement with a discharge hose.

A still further object of the present invention is to provide a permanently attached but removable fitting for interconnecting the discharge outlet of a recreational vehicle with a discharge hose.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 is a perspective view of the present invention attached to a discharge outlet;

FIG. 2 illustrates alternative attachment of the present invention to either of two types of discharge outlets;

FIG. 3 is a cross-sectional view of the present invention;

FIG. 4 is a view of the flange encircling the sleeve of the present invention;

FIG. 5 is a detail figure taken within dashed circle 5 shown in FIG. 1 and illustrates a first type of dog attendant the discharge outlet;

FIG. 6 illustrates the engagement between the flange and a second type of dog attendant the discharge outlet;

FIG. 7 is a partial cutaway side view showing attachment of the present invention to one type of discharge outlet; and FIG. 8 is a partial cutaway side view showing attachment of the present invention to another type of industry standard discharge outlet.

DETAILED DESCRIPTION OF THE PREFERRED EMBODIMENT

Referring to FIG. 1, there is shown a sleeve 10 penetrably mounted within an industry standard discharge outlet 12 used in recreational vehicles. The discharge outlet includes a radially expanded section 14 for attachment with a conduit interconnecting a holding tank of the recreational vehicle via a valve, such as a gate valve. A necked down section 16 extends axially and defines orifice 18 of discharge outlet 12. A plurality of dogs 20 (shown in FIG. 2), extend radially from necked down section 16. Dogs 20 are in the nature of radially extending cylindrical pegs, as shown in FIG. 2. A second type of industry standard discharge outlet 30 is depicted in FIG. 2 as being alternately connectable with sleeve 10. This discharge outlet includes a cylindrical section 32 for engagement, like radially expanded section 14, with a conduit extending from the holding tank of a recreational vehicle. Orifice 34 is defined by annular section 36.

A plurality of dogs 38 extend radially from section 32, as depicted. Dogs 38 are essentially, but not exactly, rectangular in cross-section. It may be noted that each of sets of dogs 20 and 38 define two orthogonally opposed pairs of dogs.

Sleeve 10 includes a first end 40 defining a sleeve or shroud for penetrable insertion through either orifice 18 of discharge outlet 12 or orifice 34 of discharge outlet 30. The first end is inserted until radial flange 42 abuts the end of necked down section 16 or annular section 36. Each of a plurality of plastic ties 44 extend through flange 42 to engage by partial encirclement each of the respective dogs of the attached discharge outlet. Thereby, the loops of the plastic ties maintain sleeve 10 secured to the respective discharge outlet and serve as a restraint to prevent separation between the sleeve and the discharge outlet. Second end 46 of sleeve 10 defines a sleeve or shroud for penetrably engaging an end of discharge hose 22 (shown in FIG. 8). When the discharge hose is not connected to sleeve 10, second end 44 may be closed by a cap 50. Loss of the cap is prevented by a cord 52 extending from an anchor 54 upon flange 42 to a further anchor 56 upon the cap. Under certain circumstances, it may be preferable to connect a conventional garden hose instead of a standard discharge hose to convey the waste water. A threaded hollow boss 58 extends from closed end 60 of cap 50. The hollow threaded boss is thereby adapted for threaded engagement with the female threaded end of a garden hose. The hollow boss may be closed by a threaded cap 62. Loss of this cap is prevented by cord 64 interconnecting anchor 66 on the cap with anchor 68 on closed end 60.

Referring jointly to FIGS. 4, 5 and 7, the use of plastic ties 44 to secure sleeve 10 to discharge outlet 12 will be described in further detail. Tie 44 may be a conventional plastic tie having a serrated tongue 70 in locking engagement with a passageway extending through end 72 of the tie. The locking apparatus within end 72 engages the serrations of tongue 70 to permit insertion, but not withdrawal of the tongue. Further details need not be described since such plastic ties are well known and readily commercially available from numerous sources. To mount plastic tie 44, tongue 70 is passed through an aperture 74 in flange 42 and partially about dog 20, as depicted. The tongue is returned through passageway 76 into penetrable engagement with end 72. Thereby, tie 44 defines a loop 78 extending through flange 42 and partially encircling dog 20. Upon tightening of the tie by drawing tongue 70 through end 72, dog 20 will be drawn toward flange 42 resulting in drawing necked down section 16 toward the flange. By drawing the loop tightly enough, orifice 18 will abut flange 42 to form a seal therebetween. To enhance such a seal, a gasket 80, as depicted in FIG. 7, may be disposed intermediate necked down section 16 and flange 42.

Referring jointly to FIGS. 4, 6 and 8, the structure for securing sleeve 10 to discharge outlet 30 will be described. For convenience and clarity, elements common with the structure illustrated in FIGS. 4, 5 and 7 will be identified by common numerals. Dogs 38, extending from section 32, are wider than dogs 20 attendant necked down section 16. Accordingly, it has been found beneficial to use passageways for tie 44 which are somewhat further apart than passageways 74,76 used in conjunction with dogs 20. A second pair of passageways 82,84 are formed in flange 42 spaced radially outwardly of pair of passageways 74,76. Tongue 70 of tie 44 is passed through passageway 82 to partially encircle dog 38 and returned through passageway 84. By penetrably engaging end 72 of the tie, loop 78 can be tightened to draw dog 38, and section 32, toward flange 42.

To enhance sealing engagement between section 32 and the flange, a gasket 86 (as shown in FIG. 8) may be interposed therebetween.

From the above discussion attendant FIGS. 4 through 8, it will be apparent that plastic ties 44 may be used to securely attach sleeve 10 to either of discharge outlets 10 or 30. In order to alleviate a user of sleeve 10 from threading each of ties 40 through a pair of the passageways commensurate with the type of discharge outlet to be engaged, slots 90,92, as depicted in FIG. 4, may be formed in flange 42. These slots permit loop 78 of an attached tie 44 to be slid radially outwardly to pair of passageways 82,84 or radially inwardly to pair of passageways 74,76 to locate the loop in conformance with the discharge outlet, and dogs, to be engaged. It is anticipated that the cross-section of each of slots 74, 76, 82, and 84 is greater than the width of either of slots 90,92 to prevent inadvertent and unwanted sliding of a tightened loop from one pair of slots to the other, which movement might loosen the restraining force exerted upon the engaged dog.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A sleeve for providing a mounting for a discharge hose to be used to receive outflow from a waste water discharge outlet of a recreational vehicle, which discharge outlet includes radially extending dogs, said sleeve comprising in combination:
   (a) a cylindrical shroud for penetrating the interior of the discharge outlet;
   (b) an annular flange for limiting the extent of penetration of said shroud into the discharge outlet;
   (c) a restraint interconnecting said flange with at least one of the dogs of the discharge outlet for restraining separation of said shroud from the discharge outlet; and
   (d) a further shroud extending from said flange for mounting the discharge hose to direct waste water from the discharge outlet into the discharge hose.

2. A sleeve for providing a mounting for a discharge hose to be used to receive outflow from a waste water discharge outlet of a recreational vehicle, which discharge outlet includes radially extending dogs, said sleeve comprising in combination:
   (a) a cylindrical shroud for penetrating the interior of the discharge outlet;
   (b) an annular flange for limiting the extent of penetration of said shroud into the discharge outlet;
   (c) a restraint interconnecting said flange with at least one of the dogs of the discharge outlet for restraining separation of said shroud from the discharge outlet;
   (d) a further shroud extending from said flange for mounting the discharge hose to direct waste water from the discharge outlet into the discharge hose; and
   (e) a removable cap for selectively closing the end of said further shroud in the absence of the discharge hose.

3. The sleeve as set forth in claim 2 wherein said cap includes a hollow boss extending therefrom for supporting a discharge conduit to convey waste water from said further shroud into the discharge conduit.

4. The sleeve as set forth in claim 3 including a further cap for selectively closing said hollow boss.

5. The sleeve as set forth in claim 3 wherein said hollow boss is threaded to threadedly engage a threaded end of the discharge conduit.

6. A sleeve for providing a mounting for a discharge hose to be used to receive outflow from a waste water discharge outlet of a recreational vehicle, which discharge outlet includes radially extending dogs, said sleeve comprising in combination:
 (a) a cylindrical shroud for penetrating the interior of the discharge outlet;
 (b) an annular flange for limiting the extent of penetration of said shroud into the discharge outlet;
 (c) a gasket disposed intermediate the discharge outlet and said sleeve to seal the junction between the discharge outlet and said sleeve;
 (d) a restraint interconnecting said flange with at least one of the dogs of the discharge outlet for restraining separation of said shroud from the discharge outlet; and
 (e) a further shroud extending from said flange for mounting the discharge hose to direct waste water from the discharge outlet into the discharge hose.

7. The sleeve as set forth in claim 6 wherein said gasket is disposed adjacent said flange to engage the end of the discharge outlet.

8. A sleeve for providing a mounting for a discharge hose to be used to receive outflow from a waste water discharge outlet of a recreational vehicle, which discharge outlet includes radially extending dogs, said sleeve comprising in combination:
 (a) a cylindrical shroud for penetrating the interior of the discharge outlet;
 (b) an annular flange for limiting the extent of penetration of said shroud into the discharge outlet;
 (c) a restraint interconnecting said flange with at least one of the dogs of the discharge outlet for restraining separation of said shroud from the discharge outlet, said restraint including a plastic tie having a loop extending partially about a dog for securing said flange to the dog; and
 (d) a further shroud extending from said flange for mounting the discharge hose to direct waste water from the discharge outlet into the discharge hose.

9. The sleeve as set forth in claim 8 wherein said flange includes at least one aperture for penetrable engagement by said plastic tie to permit drawing said flange toward the dog with said loop of said plastic tie.

10. The sleeve as set forth in claim 9 wherein said flange includes at least a pair of apertures for penetrably receiving and retaining said loop of said plastic tie securing the dog.

11. The sleeve as set forth in claim 10 wherein said flange includes at least one set of two pairs of apertures radially displaced from one another to permit engagement by said loop of said plastic tie of differently configured dogs that may extend from the discharge outlet.

12. The sleeve as set forth in claim 11 including a slot extending from each aperture of one pair of said two pairs of apertures to one of the apertures of said other pair of said two pairs of apertures.

13. The sleeve as set forth in claim 2 including a cord interconnecting said cap with said sleeve to prevent loss of said cap upon disengagement of said cap from said sleeve.

14. The sleeve as set forth in claim 4 including a cord interconnecting said further cap with said cap to prevent loss of said further cap upon disengagement of said further cap from said hollow boss.

15. Apparatus for interconnecting a discharge hose with a discharge outlet having a plurality of dogs disposed thereabout, said apparatus comprising in combination:
 (a) a sleeve having a first end and a second end, said first end being sized for penetrable insertion into the discharge outlet and said second end being sized for engagement with the discharge hose;
 (b) an annular flange for limiting insertion of said first end into the discharge outlet; and
 (c) a restraint for interconnecting said flange with at least one of the dogs of the discharge outlet for restraining separation of said first end from within the discharge outlet.

16. Apparatus for interconnecting a discharge hose with a discharge outlet having a plurality of dogs disposed thereabout, said apparatus comprising in combination:
 (a) a sleeve having a first end and a second end, said first end being sized for penetrable insertion into the discharge outlet and said second end being sized for engagement with the discharge hose;
 (b) an annular flange for limiting insertion of said first end into the discharge outlet;
 (c) a restraint for interconnecting said flange with at least one of the dogs of the discharge outlet for restraining separation of said first end from within the discharge outlet; and
 (d) at least a further restraint for interconnecting said flange with another one of the dogs of the discharge outlet for restraining separation of said first end from within the discharge outlet.

17. Apparatus for interconnecting a discharge hose with a discharge outlet having a plurality of dogs disposed thereabout, said apparatus comprising in combination:
 (a) a sleeve having a first end and a second end, said first end being sized for penetrable insertion into the discharge outlet and said second end being sized for engagement with the discharge hose;
 (b) an annular flange for limiting insertion of said first end into the discharge outlet; and
 (c) a restraint for interconnecting said flange with at least one of the dogs of the discharge outlet for restraining separation of said first end from within the discharge outlet, said restraint including a loop extending from said flange and partially about the interconnected dog.

18. The apparatus as set forth in claim 16 wherein said restraint and said further restraint include a loop and a further loop, respectively, extending from said flange and partially about the respective one of the dogs.

19. The apparatus as set forth in claim 17 wherein said flange includes a pair of apertures for penetrable engagement by said loop.

20. The apparatus as set forth in claim 18 wherein said flange includes a further pair of apertures for penetrable engagement in the alternative by said loop.

21. The apparatus as set forth in claim 20 wherein said flange includes a plurality of pairs of apertures and a plurality of further pairs of apertures.

22. The apparatus as set forth in claim 20 including a pair of slots interconnecting corresponding apertures of said pair of apertures and said further pair of apertures to permit repositioning of said loop from one to the other of said pair of apertures and said further pair of apertures.

* * * * *